United States Patent
Barnes et al.

(10) Patent No.: US 6,923,166 B2
(45) Date of Patent: Aug. 2, 2005

(54) SUPERCHARGING ASSEMBLY FOR AN INTERNAL COMBUSTION ENGINE OF A MOTOR VEHICLE

(75) Inventors: Jerry Barnes, Orchard Lake Village, MI (US); Michal Labas, Westland, MI (US); Zbynek Hranac, Dearborn Heights, MI (US); Miroslav Novak, Dearborn, MI (US)

(73) Assignee: Trilogy Motorsports, LLC, Dearborn, MI (US)

( * ) Notice: Subject to any disclaimer, the term of this patent is extended or adjusted under 35 U.S.C. 154(b) by 14 days.

(21) Appl. No.: 10/675,662

(22) Filed: Sep. 30, 2003

(65) Prior Publication Data

US 2005/0066946 A1 Mar. 31, 2005

(51) Int. Cl.[7] ................................................ F02B 33/00
(52) U.S. Cl. ................................................... 123/559.1
(58) Field of Search ............................ 123/559.1, 563, 123/184.34, 184.61

(56) References Cited

U.S. PATENT DOCUMENTS

| | | | | |
|---|---|---|---|---|
| 5,058,558 A | * | 10/1991 | Ueda et al. ............... | 123/559.1 |
| 5,448,982 A | * | 9/1995 | Arakawa et al. ......... | 123/559.1 |
| 5,460,145 A | * | 10/1995 | Perry, Jr. .................. | 123/559.1 |
| 5,911,211 A | * | 6/1999 | Uchida ..................... | 123/559.1 |
| 6,012,436 A | * | 1/2000 | Boutcher .................. | 123/559.1 |
| 6,029,637 A | * | 2/2000 | Prior ......................... | 123/559.1 |
| 6,079,394 A | * | 6/2000 | Abthoff et al. ........... | 123/559.1 |
| 6,453,890 B1 | * | 9/2002 | Kageyama et al. ...... | 123/559.1 |
| 6,604,514 B1 | * | 8/2003 | Englund et al. .......... | 123/559.1 |
| 6,619,275 B2 | * | 9/2003 | Wiik ......................... | 123/559.1 |

FOREIGN PATENT DOCUMENTS

| | | | | | |
|---|---|---|---|---|---|
| JP | 63309720 A | * | 12/1988 | ............... | 123/559.1 |
| JP | 02227515 A | * | 9/1990 | ............... | 123/559.1 |

* cited by examiner

Primary Examiner—Thai-Ba Trieu
(74) Attorney, Agent, or Firm—Clark Hill PLC

(57) ABSTRACT

A supercharging assembly increases an amount of air received through an inlet port of an internal combustion engine of a motor vehicle. The motor vehicle has a hood extending thereover. The supercharging assembly includes a lower intake manifold fixedly secured to the internal combustion engine. A blower is operatively connected to the lower intake manifold for forcing air into the lower intake manifold with increased pressure to create charged air. An inlet duct is operatively connected between the inlet port and the blower for directing air into the blower. An output plate is fixedly secured to the lower intake manifold. The output plate mounts the blower to the lower intake manifold. The output plate includes a recessed portion extending down from the lower intake manifold such that the blower is mounted to the recess portion to provide clearance for the hood to move to a closed position over the internal combustion engine.

14 Claims, 6 Drawing Sheets

SUPERCHARGING ASSEMBLY FOR AN INTERNAL COMBUSTION ENGINE OF A MOTOR VEHICLE

BACKGROUND ART

1. Technical Field

The invention relates to a supercharging assembly for an internal combustion engine of a motor vehicle. More particularly, the invention relates to a supercharging assembly having a low profile allowing it to be mounted to and integrating with an internal combustion engine of a motor vehicle without having to modify the look of the motor vehicle.

2. Description of the Related Art

Automobile enthusiasts enjoy working on their automobiles and having worked on them to enhance the look or performance thereof. Supercharging a motor vehicle is a typical way that one can enhance the performance of the internal combustion engine of the motor vehicle. A supercharger, similar to a turbo charger, increases the amount of air being injected into the cylinders of the internal combustion engine. Along with the increased air, increased fuel consumption can occur with the increased amounts of air present in the cylinders. The resulting effect is the same internal combustion engine for the motor vehicle produces a higher output than it was designed to do without the charging of the air prior to the injection of the fuel and air into the cylinders of the internal combustion engine.

A supercharger utilizes the power generated by the internal combustion engine to power a blower to force more air into the internal combustion engine. Conversely, a turbo charger receives its power from the stream of exhaust fumes exiting the motor vehicle through the exhaust manifold. Regardless of where the added units obtain their power to charge the air coming into the internal combustion engine, both enhance performance by increasing the amount of air entering the internal combustion engine for combustion of fuel.

One problem with adding a supercharger to an internal combustion engine of a motor vehicle is the increased size of the resulting internal combustion engine. A supercharger typically is mounted on top of the internal combustion engine because that is where the air enters the cylinders via an inlet port found typically near the front of the motor vehicle. By placing a supercharger on top of an internal combustion engine, the overall profile of the internal combustion engine grows. This presents a problem because a hood covering the internal combustion engine typically does not allow for much clearance between it and the internal combustion engine. Therefore, the hood needs to be modified or replaced to provide space for the supercharger over the internal combustion engine. Oftentimes, this is not desirable as it detracts from the overall aesthetics of the motor vehicle. In addition, it increases attention to the motor vehicle as well as increases the cost associated with doing such modifications to the internal combustion engine.

SUMMARY OF THE INVENTION

A supercharging assembly increases an amount of air received through an inlet port of an internal combustion engine of a motor vehicle. The motor vehicle has a hood extending thereover. The supercharging assembly includes a lower intake manifold fixedly secured to the internal combustion engine. A blower is operatively connected to the lower intake manifold for forcing air into the lower intake manifold with increased pressure to create charged air. An inlet duct is operatively connected between the inlet port and the blower for directing air into the blower. An output plate is fixedly secured to the lower intake manifold. The output plate mounts the blower to the lower intake manifold. The output plate includes a recessed portion extending down from the lower intake manifold such that the blower is mounted to the recess portion to provide clearance for the hood to move to a closed position over the internal combustion engine.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
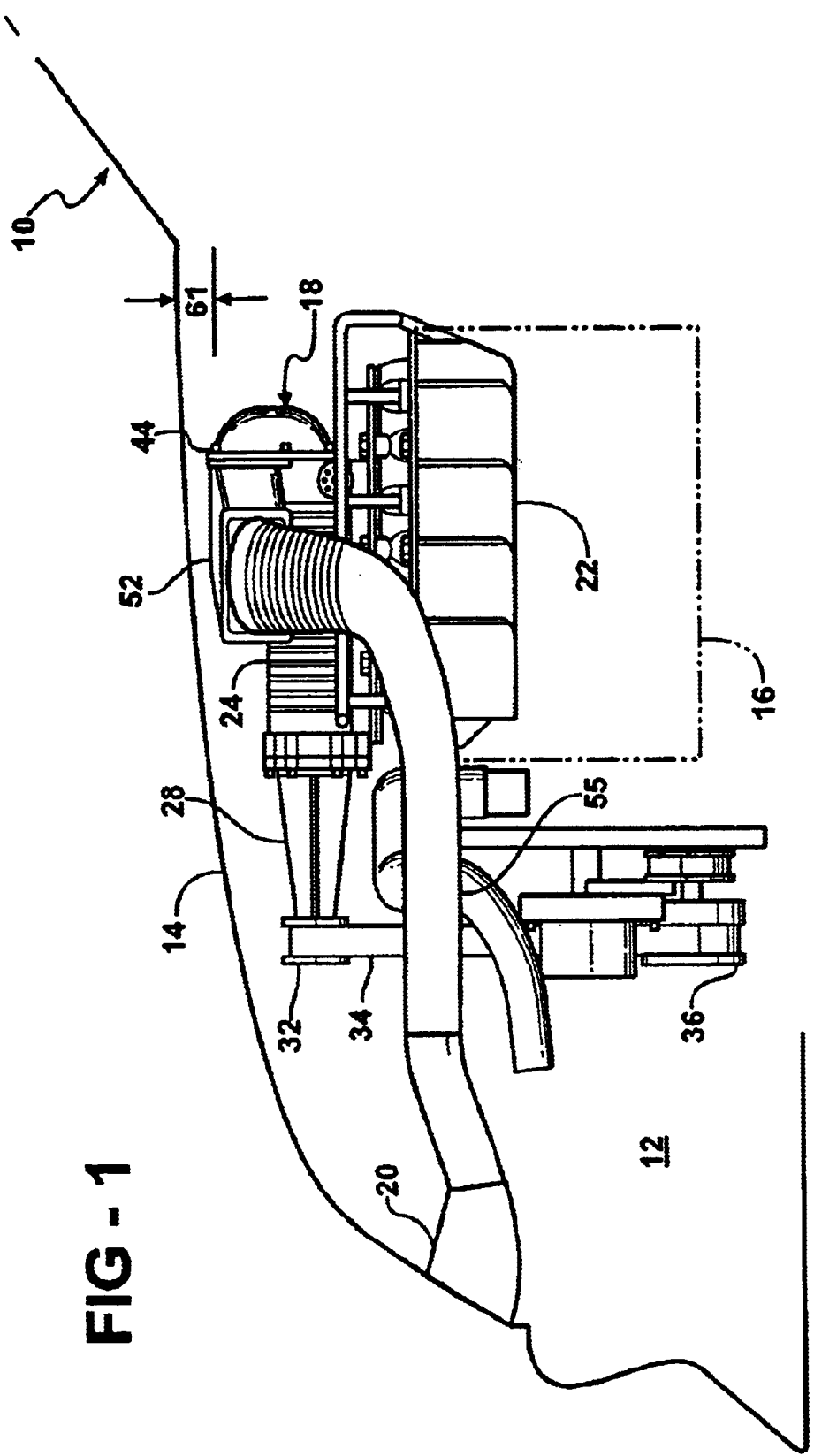
FIG. 1 is a side view of a motor vehicle, partially cut away, with the internal combustion engine and one embodiment of the invention mounted thereto.
Figure 2:
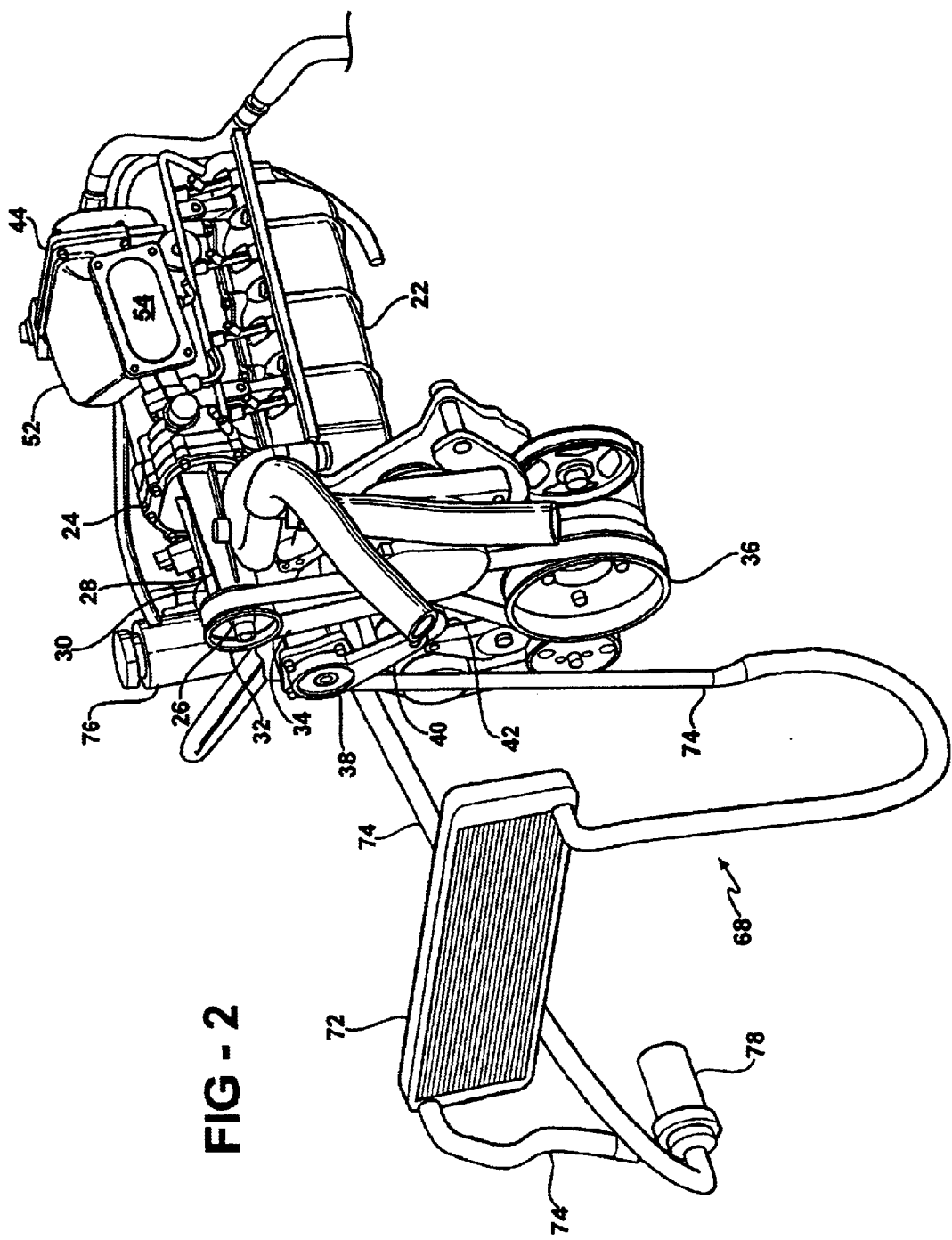
FIG. 2 is perspective view of the supercharging assembly according to one embodiment of the invention.
Figure 3:
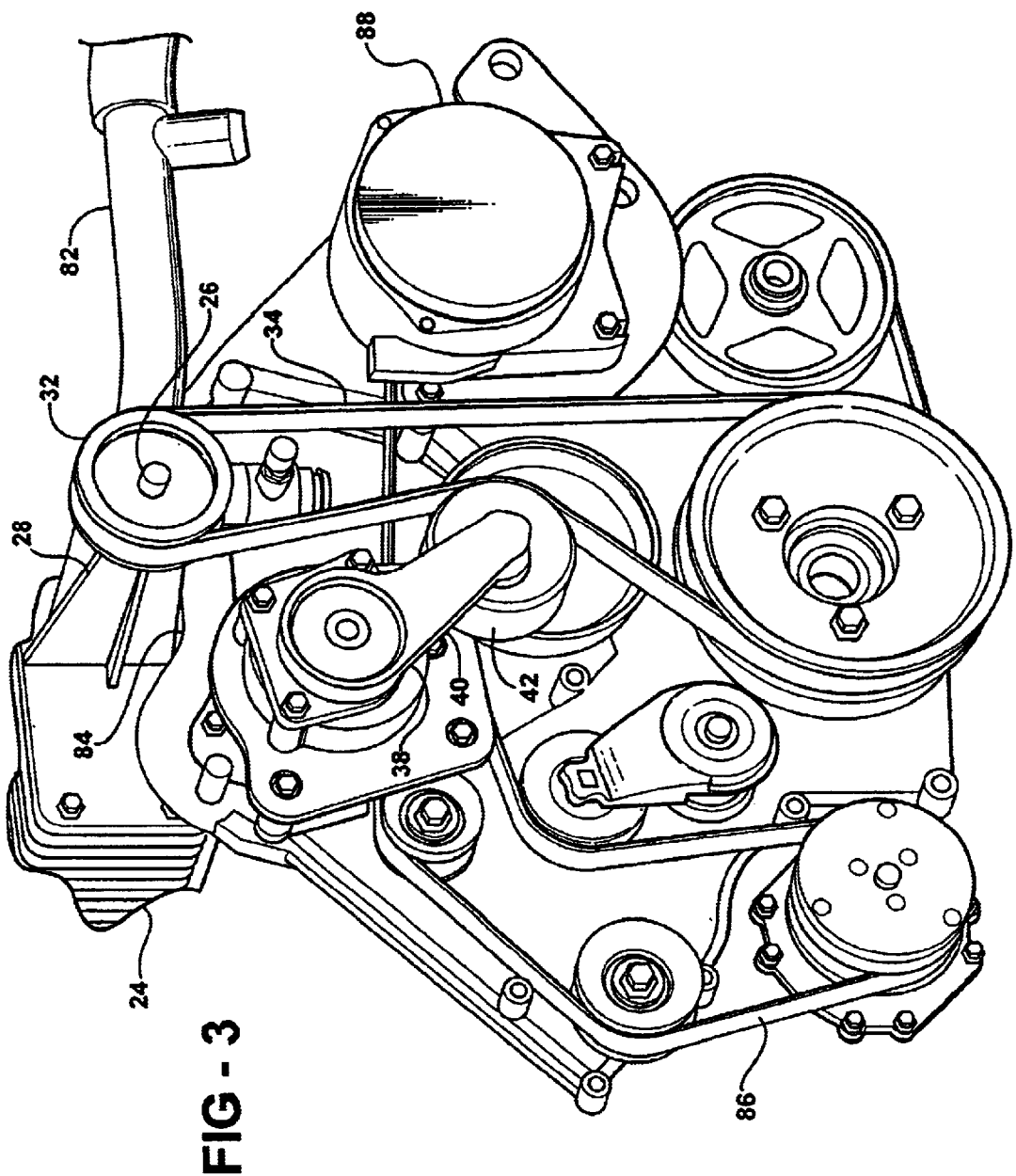
FIG. 3 is a front view of the invention.

Referring to FIG. 1, a motor vehicle 10 is shown in phantom and partially cut away. The motor vehicle 10 includes an engine compartment 12 and a decklid or hood 14 that selectively covers the engine compartment 12. Moving the hood 14 from its closed position, as is shown in FIG. 1, to an open position allows access to the engine compartment 12 and an internal combustion engine 16 stored therein. The internal combustion engine 16 powers the motor vehicle 12 and provides the force necessary to move the motor vehicle 10. It should be appreciated by those skilled in the art that the internal combustion engine 16 may be any type of internal combustion engine and is not limited to a specific design.

The invention is a supercharging assembly, generally indicated at 18. The supercharging assembly is fixedly secured to the internal combustion engine 16. The supercharging assembly 18 increases the amount of air received through an inlet port 20 of the internal combustion engine 16. The supercharging assembly 18 is designed to increase the amount of air being forced through the injectors of the internal combustion engine 16. In one embodiment, the pressure of the air within the cylinders (not shown) of the internal combustion engine 16 increase from 20 pounds of force to 43 pounds of force. By adding more air to the cylinders of the internal combustion engine 16, more fuel is allowed to mix with the air allowing more power to be generated by the internal combustion engine 16 if the supercharging assembly 18 were not present.

Figure 5:
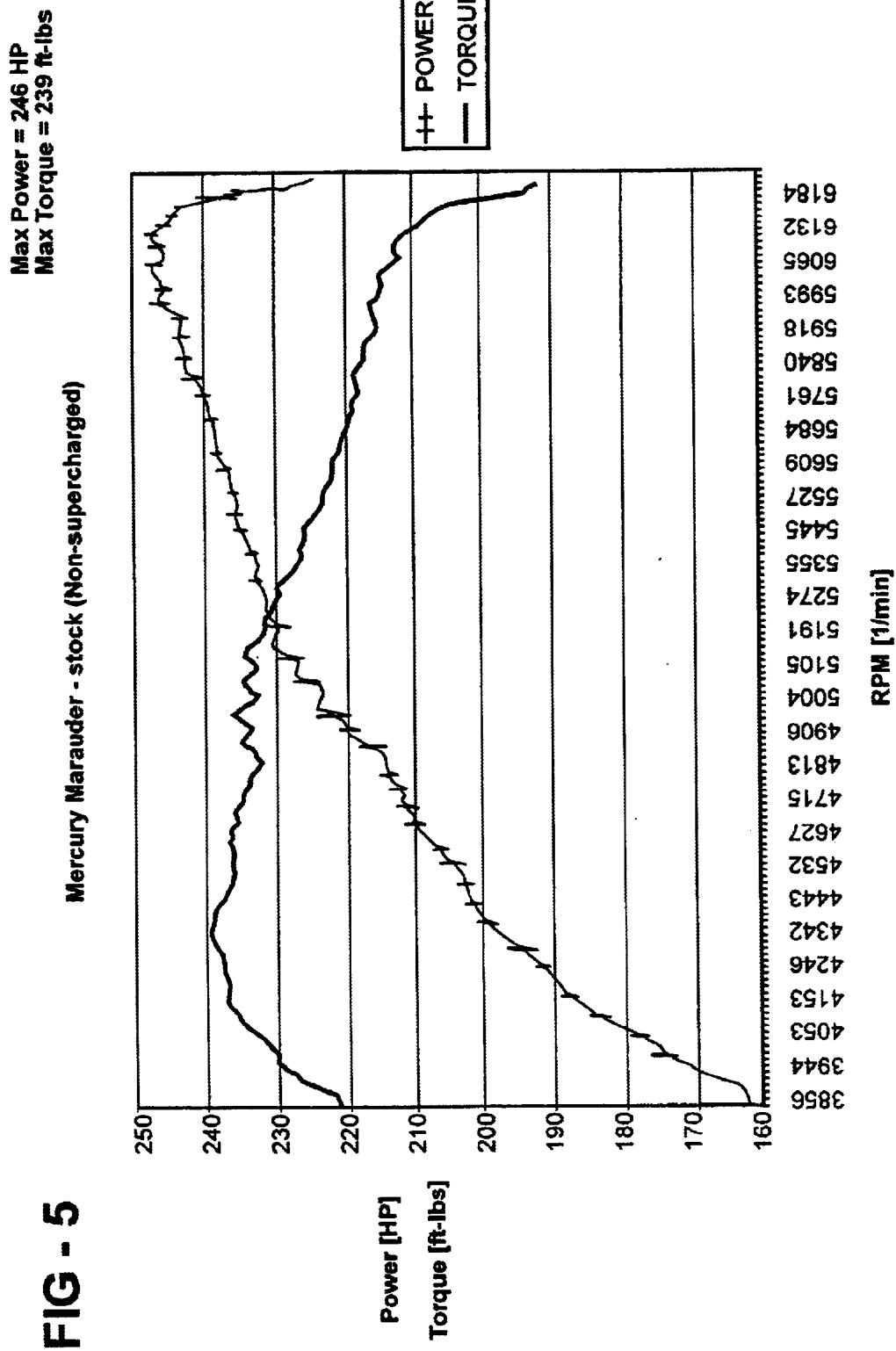
FIG. 5 is a graph representing an output of an internal combustion engine that is not supercharged.
Figure 6:
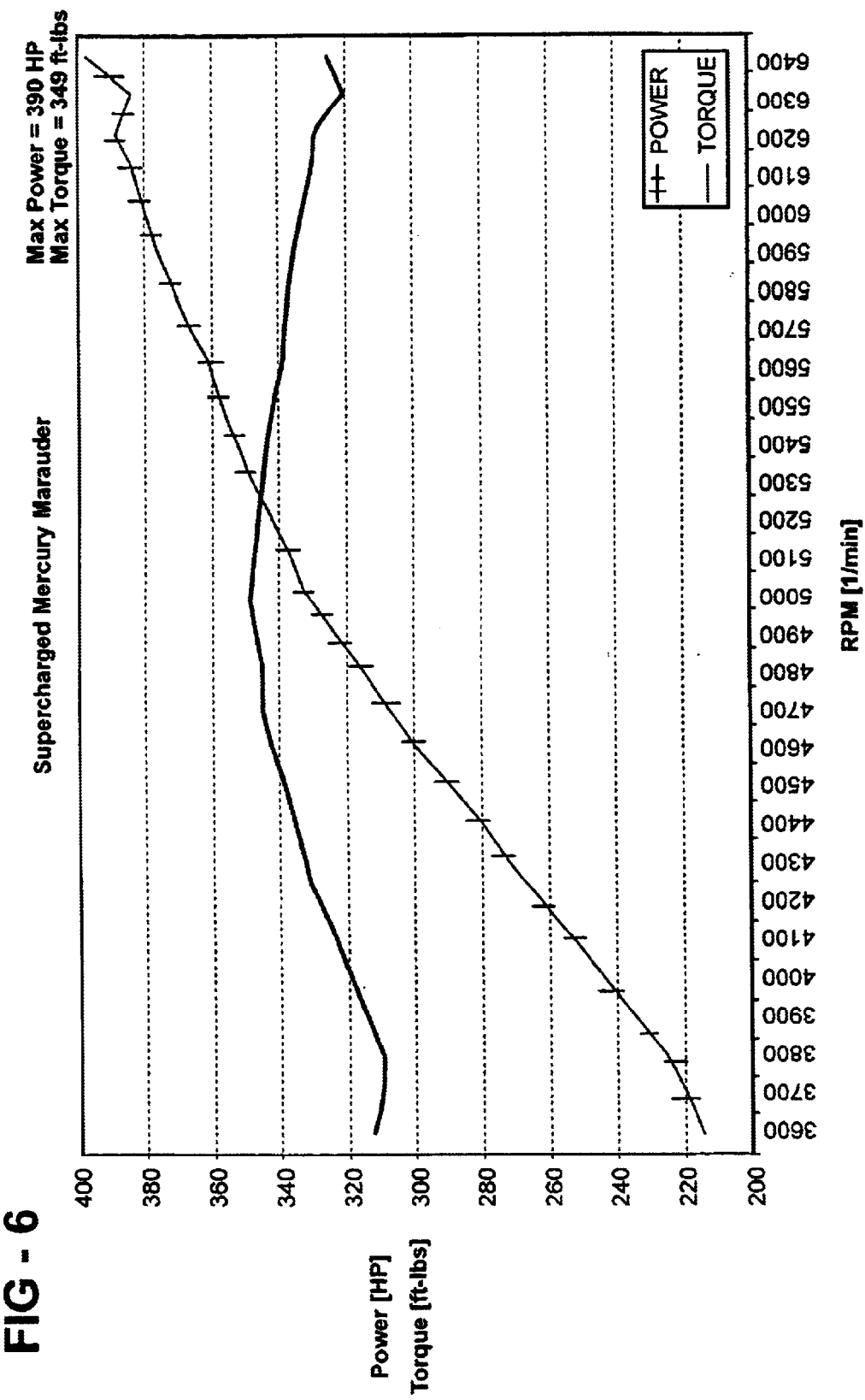
FIG. 6 is a graphic representation of output of a supercharged internal combustion engine incorporating the invention therein.

Referring to FIG. 5, it can be seen that the maximum power for a specific internal combustion engine 16 that does not incorporate the invention has a maximum power of 246 horsepower and a maximum torque of 239 foot pounds. With reference to FIG. 6, the output of an internal combustion engine that does include a supercharging assembly 18 according to the invention shows an increased maximum power of 390 horsepower and a maximum torque of 349 foot pounds. The increases in power and torque are directly related to the increase in the amount of air and fuel that are injected into the cylinders of the internal combustion engine 16.

Returning attention to FIGS. 1 through 4, the supercharging assembly 18 includes a lower intake manifold 22. The lower intake manifold 22 is fixedly secured to the internal combustion engine 16. The lower intake manifold 16 receives and stores air that is about to be combusted by the internal combustion engine 16. The lower intake manifold 22 stores the air at a higher pressure (hereinafter referred to as "charged air") prior to its delivery to the cylinders of the internal combustion engine 16 where it is typically mixed with the fuel along the way.

The supercharging assembly 18 also includes a blower 24 that is operatively connected to the lower intake manifold 22. The blower 24 creates the charged air by forcing air into the lower intake manifold 22 with increased pressure. The blower 24 has a shaft 26 that extends out across a portion of the internal combustion engine 16. In the preferred embodiment, the shaft 26 extends in a forward direction toward the front of the motor vehicle 10. The shaft 26 is housed within a shaft housing 28. The shaft housing 28 extends out to a shaft distal end 30. A blower pulley 32 is fixedly secured to the shaft 26 adjacent the shaft distal end 30. A blower belt 34 extends around the blower pulley 32 and a drive pulley 36, which is a part of the internal combustion engine 16. The drive pulley 36 is driven by the internal combustion engine 16. The drive pulley 36 rotates the blower pulley 32 via the blower belt 34. The rotation of the blower pulley 32 rotates the shaft 26 which operates the blower 24 to charge the air before it is received by the lower intake manifold 22.

The blower belt 34 has a predetermined tension. This tension is defined by a variable tensioning mechanism 38. The variable tensioning mechanism 38 includes a tension arm 40 and a tension pulley 42. The tension pulley 42 engages the blower belt 34 allowing a portion of the blower belt 34 to wrap around the tension pulley 42. The amount of the blower belt 34 that engages the tension pulley 42 is directly related to the angle at which the tension arm 40 is set. The tension on the blower belt 34 is to remain constant. Any adjustment in the orientation of the tension arm 40 is done should it be desired that the blower pulley 32 be changed to one having a different diameter. This is done typically to change the amount of blowing capacity the blower 24 is capable of performing which will have an affect on the output power generated by the supercharged internal combustion engine.

The blower 24 receives air through an inlet duct 44, which is operatively connected between the inlet port 20 and the blower 24. The inlet duct 44 directs the air received from the inlet port 20 into the blower 24. In the embodiment shown, the inlet duct 44 defines a channel 46 that extends through a curved path. The curved path is C-shaped. The inlet duct 44 defines an inlet opening 48 and an outlet opening 50. Because the channel 46 is C-shaped, the inlet opening 48 is disposed directly above the outlet opening 50. In addition, the inlet 48 and outlet 50 openings extend through the same plane. The inlet duct 44 is designed to redirect the air received from the inlet port 20 so that it can be received by the blower 24.

A spacer 52 is fixedly secured to the inlet opening 48 of the inlet duct 44. The spacer 52 also extends through a curved path and defines a spacer channel 54 that directs the air received from the inlet port 20 to the inlet duct 44. The spacer channel 54 is operatively connected to the inlet port 20. More specifically, the spacer channel 54 is connected to a throttle body (not shown) of the internal combustion engine 16, which is directly connected to the inlet port 20 via an inlet port extension 55. The throttle body is a part of the internal combustion engine 16 and is not included in the Figures for purposes of clarity.

Figure 4:
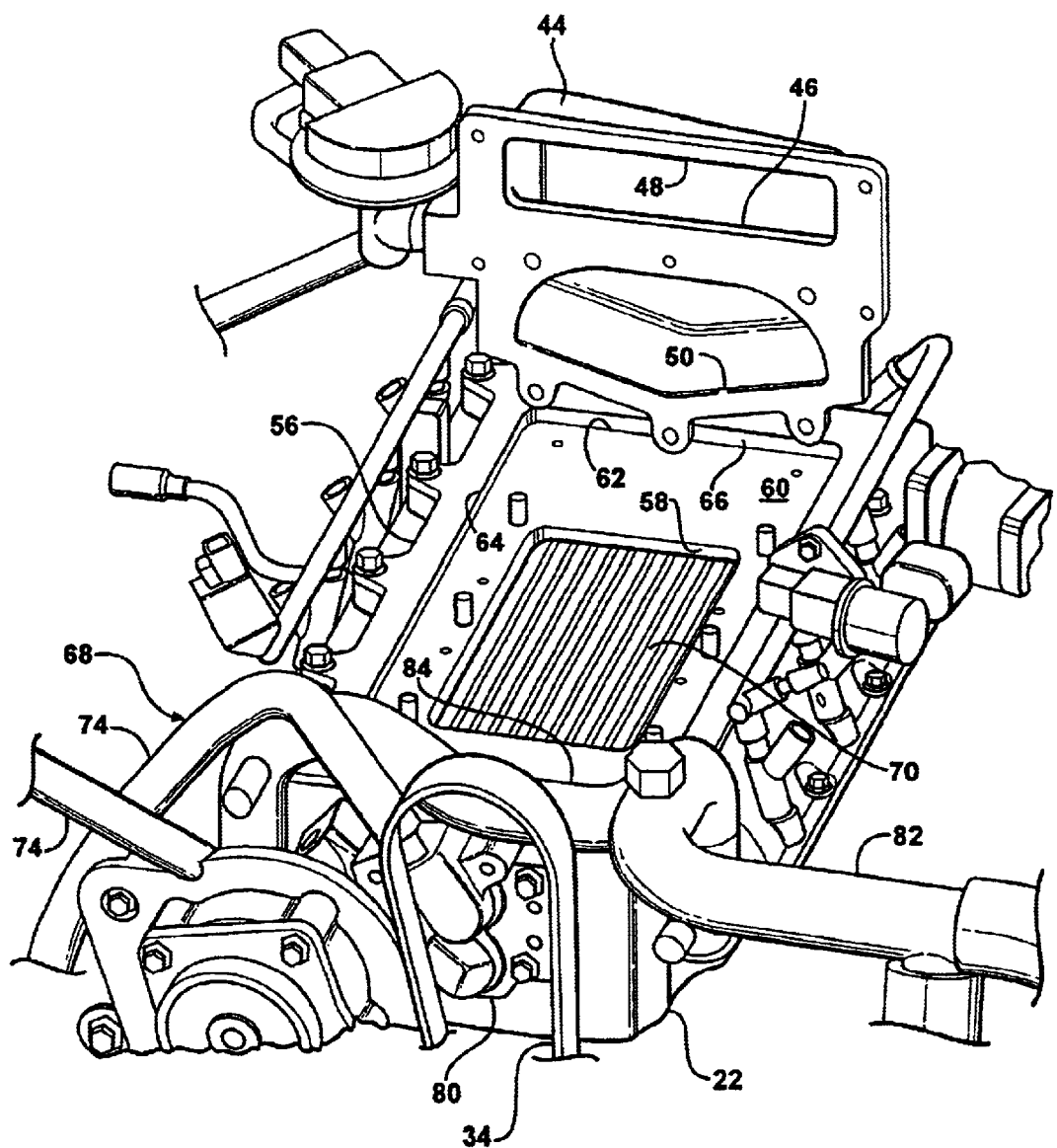
FIG. 4 is a perspective view of the supercharger assembly with the blower assembly removed therefrom.

Referring specifically to FIG. 4, the supercharging assembly 18 includes an outlet plate 56. The outlet plate 56 is fixedly secured to the lower intake manifold 22. The blower 24 is mounted directly to the outlet plate 56 and allows for direct communication between the blower 24 and the lower intake manifold 22.

The outlet plate 56 defines a plate opening 58 that allows charged air from the blower 24 to enter the lower intake manifold 22. The plate opening 58 is rectangular in shape and is disposed generally toward the center of the outlet plate 56.

The outlet plate 56 also includes a recess 60 that extends down into the lower intake manifold 22 such that the blower 24 is mounted to the recess 60 to provide clearance 61 for the hood 14 to move to its closed position over the internal combustion engine 16. In order for the supercharging assembly 18 to be mounted to the internal combustion engine 16 in a manner such that the hood 14 may be moved to a close position without modification to the hood 14, the supercharging assembly 18 must be compact in size. In order to do so, a portion of the blower 24 must extend into the lower intake manifold 22 without reducing the volume defined by the lower intake manifold 22 by a significant amount. Therefore, the recess 60, which is only a portion of the overall surface of the outlet plate 56, extends downwardly into the lower intake manifold 22 allowing the blower 24 to be mounted to the lower intake manifold 22 at a position within the lower intake manifold 22 to reduce the profile of the supercharging assembly 18, thus allowing the hood 14 to be closed and provide sufficient clearance to the supercharging assembly 18 to allow it to operate properly.

The recess 60 defines a blower plate 62 and a frame 64. The frame 64 is fixedly secured to the lower intake manifold 22. The blower plate 62 extends below the frame 64. A connecting wall 66 extends between the frame 64 and the blower plate 62. In the embodiment shown, the connecting wall 66 is perpendicular to both the blower plate 62 and the frame 64. The connecting wall 66 is solid, preventing air from the blower 24 from escaping the lower intake manifold 22. Although not shown, it is contemplated that the blower 24 is sealed against the outlet plate 56 to maximize the efficiency of the blower 24 and the supercharging assembly 18.

The supercharging assembly 18 also includes a cooling system, generally shown at 68, that cools the charged air that is stored in the lower intake manifold 22. When the blower 24 charges the air and forces it to be stored within the lower intake manifold 22 at a higher temperature, in combination with the thermal energy generated by the internal combustion engine 16, the charged air has an elevated thermal energy. To maximize the ability of the internal combustion engine 16 to combust the fuel that is mixed with the charged air, the charged air should be cooled. Therefore, the cooling system 68 is designed to remove thermal energy from the charged air that is stored within the lower intake manifold 24.

The cooling system 68 includes an inner heat exchanger 70 that receives thermal energy from the charged air within the lower intake manifold 22. The inner heat exchanger 70 extends through the intake manifold 22 directly below the outlet plate 56. Returning attention to FIG. 4, the inner heat exchanger 70 is shown through the plate opening 58 of the outlet plate 56. The thermal energy collected by the inner heat exchanger 70 is removed from the cooling system 68 via an exterior heat exchanger 72. The exterior heat exchanger 72 receives the thermal energy from the inner heat exchanger 70 and transfers that thermal energy to air that is passing over the exterior heat exchanger 72 during the operation of the motor vehicle 10. The exterior heat exchanger 72 is designed similar to that of a radiator of the motor vehicle. In fact, the exterior heat exchanger 72 is disposed adjacent a radiator (not shown) of the internal combustion engine 16. The exterior heat exchanger 72 utilizes the same air that passes over the radiator and transfers the thermal energy to it as it passes through both the radiator and the exterior heat exchanger 72.

The inner 70 and exterior 72 heat exchangers are connected to each other by a series of tubes 74 that allow fluid within the cooling system 68 to move through a circuit defined by the inner 70 and exterior 72 heat exchangers and the tubes 74 that are connected therebetween. A reservoir 76 is in communication with the tubes 74 and provides a storage facility for the fluid as the fluid expands due to increased absorption of thermal energy from the inner heat exchanger 70. A pump 78 is also in fluid communication with the tube 74 and directs the fluid therewithin in one direction ensuring that fluid is moving through the tubes 74 and the heat exchangers 70, 72. A heat exchanging mounting plate 80 is fixedly secured to the lower intake manifold 22. Two tubes 74 are connected to the heat exchanging mounting plate 80. In addition, the inner heat exchanger 70 is mounted thereto. The heat exchanging mounting plate 80 allows the cooling system 68 to enter and exit the lower intake manifold 22 without compromising the seal in the lower intake manifold 22.

In addition to the addition of the supercharging assembly 18, a crossover tube 82 was redesigned to include a lower portion 84 to make room for the shaft 26 and the shaft housing 28. In addition, a belt drive 86 was redirected to ensure the lower belt 34 had an opportunity to reach the blower pulley 32. An alternator 88 for the internal combustion engine 16 was also moved as a direct result of having to move the belt drive.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A supercharging assembly for increasing an amount of air received through an inlet port of an internal combustion engine of a motor vehicle having a hood extending thereover, said supercharging assembly comprising:
   a lower intake manifold fixedly secured to the internal combustion engine;
   a blower operatively connected to said lower intake manifold for forcing air into said lower intake manifold with increased pressure to create charged air;
   an inlet duct operatively connected between the inlet port and said blower for directing the air into said blower; and
   an output plate fixedly secured to said lower intake manifold for mounting said blower to said lower intake manifold, said output plate including a frame surrounding a recess defining a blower plate, extending down into said lower intake manifold, and a connecting wall, extending between said frame and said blower plate to space said blower plate in relation to said frame, such that said blower is mounted to said blower plate to provide clearance for the hood to move to a closed position over the internal combustion engine.

2. A supercharging assembly as set forth in claim 1 wherein said connecting wall is perpendicular to said blower plate and said frame.

3. A supercharging assembly as set forth in claim 2 including a cooling system for cooling said charged air stored in said lower intake manifold.

4. A supercharging assembly as set forth in claim 3 wherein said cooling system includes an inner heat exchanger disposed within said lower intake manifold below said output plate to collect thermal energy stored in said charged air.

5. A supercharging assembly as set forth in claim 4 wherein said blower includes a shaft housing extending outwardly therefrom to a shaft distal end.

6. A supercharging assembly as set forth in claim 5 including a blower pulley fixedly secured to said shaft distal end.

7. A supercharging assembly as set forth in claim 6 including a blower belt extending between said blower pulley and the internal combustion engine to allow the internal combustion engine to drive said blower.

8. A supercharging assembly as set forth in claim 7 including a variable tensioning mechanism to adjust tension in said blower belt.

9. A supercharging assembly as set forth in claim 8 wherein said cooling system includes an exterior heat exchanger to remove thermal energy from said cooling system collected by said inner heat exchanger.

10. A supercharging assembly for increasing an amount of air received through an inlet port of an internal combustion engine of a motor vehicle having a hood extending thereover, said supercharging assembly comprising:
    a lower intake manifold fixedly secured to the internal combustion engine;
    a blower operatively connected to said lower intake manifold for forcing air into said lower intake manifold with increased pressure to create charged air, said blower including a shaft housing extending outwardly therefrom to a shaft distal end;
    a blower pulley fixedly secured to said shaft distal end;
    a blower belt extending between said blower pulley and the internal combustion engine to allow the internal combustion engine to drive said blower;
    a variable tensioning mechanism to adjust tension in said blower belt;
    a spacer defining an air flow path between said inlet duct and the inlet port;
    an inlet duct operatively connected between the inlet port and said blower for directing the air into said blower;
    an output plate fixedly secured to said lower intake manifold for mounting said blower to said lower intake manifold, said output plate including a recess extending down into said lower intake manifold such that said blower is mounted to said recess to provide clearance for the hood to move to a closed position over the internal combustion engine; and a cooling system for cooling said charged air stored in said lower intake manifold, said cooling system including an inner heat exchanger, disposed within said lower intake manifold below said output plate to collect thermal energy stored in said charged air, and an exterior heat exchanger to remove thermal energy from said cooling system collected by said inner heat exchanger.

11. A supercharging assembly as set forth in claim 1 wherein said output plate defines a frame that is fixedly secured to said lower intake manifold.

12. A supercharging assembly as set forth in claim 11 wherein said recess including a blower plate extending below said frame.

13. A supercharging assembly as set forth in claim 12 wherein said recess includes a connecting wall extending between said frame and said blower plate to space said blower plate in relation to said frame.

14. A supercharging assembly as set forth in claim 13 wherein said connecting wall is perpendicular to said blower plate and said frame.

* * * * *